United States Patent
Forrest et al.

(10) Patent No.: US 6,874,574 B2
(45) Date of Patent: *Apr. 5, 2005

(54) ENERGY EFFICIENT CONTROL METHOD FOR A MANUALLY REGULATED VEHICLE HEATING AND AIR CONDITIONING SYSTEM

(75) Inventors: Wayne Oliver Forrest, Gasport, NY (US); Lawrence Scherer, North Tonawanda, NY (US); Nicholas Joseph Alonge, Jr., Tonawanda, NY (US); Elliott D. Keen, Lockport, NY (US); James E. Stoelting, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 173 days.

This patent is subject to a terminal disclaimer.

(21) Appl. No.: 09/992,587

(22) Filed: Nov. 6, 2001

(65) Prior Publication Data

US 2003/0085031 A1 May 8, 2003

(51) Int. Cl.$^7$ .......................... F25B 29/00; B60H 1/00; B60H 3/00
(52) U.S. Cl. ...................... 165/202; 165/263; 165/264; 165/42; 165/43; 62/229
(58) Field of Search .................. 165/202, 42, 43, 165/263, 264; 62/229

(56) References Cited

U.S. PATENT DOCUMENTS

| | | | | |
|---|---|---|---|---|
| 4,323,111 A | | 4/1982 | Iijima | 165/25 |
| 4,354,547 A | * | 10/1982 | Sugiura | 165/43 |
| 4,375,754 A | * | 3/1983 | Okura | 165/43 |
| 4,383,574 A | | 5/1983 | Yoshioka | 165/43 |
| 4,450,898 A | | 5/1984 | Tanino | 165/25 |
| 4,466,480 A | * | 8/1984 | Ito et al. | 165/43 |
| 4,540,040 A | * | 9/1985 | Fukumoto et al. | 165/43 |
| 5,191,768 A | * | 3/1993 | Fujii | 62/209 |
| 6,092,380 A | | 7/2000 | Kachur et al. | |
| 6,234,398 B1 | | 5/2001 | Pawlak, III et al. | |
| 6,293,116 B1 | | 9/2001 | Forrest et al. | |
| 6,321,695 B1 | | 11/2001 | Yoo et al. | |
| 6,434,958 B1 | | 8/2002 | Koors et al. | |
| 6,508,408 B2 | | 1/2003 | Kelly et al. | |
| 6,588,222 B1 | | 7/2003 | Urbank et al. | |
| 6,622,500 B1 | | 9/2003 | Archibald et al. | |
| 6,625,997 B1 | | 9/2003 | Schultz | |
| 6,651,895 B1 | | 11/2003 | Kadle et al. | |
| 2003/0127219 A1 | * | 7/2003 | Forrest et al. | 165/202 |

FOREIGN PATENT DOCUMENTS

| | | | |
|---|---|---|---|
| EP | 1308327 A2 | * | 10/2002 |
| FR | 2827223 | | 1/2003 |
| JP | 57-209412 | * | 12/1982 |
| JP | 60-12329 | * | 1/1985 |
| JP | 60-146712 | * | 8/1985 |
| JP | 62-261516 | * | 11/1987 |
| JP | 64-85808 | * | 3/1989 |
| JP | 1-136809 | * | 5/1989 |

* cited by examiner

*Primary Examiner*—John K. Ford
(74) *Attorney, Agent, or Firm*—Patrick M. Griffin

(57) ABSTRACT

An improved, more efficient method of operation for a vehicle heating and air conditioning system electrically positions a temperature control actuator in accordance with a first temperature control schedule for coordinated control of compressor capacity and re-heating of the discharge air when air conditioning is enabled, in accordance with a second temperature control schedule when air conditioning is disabled. Both first and second temperature control schedules position the temperature control actuator as a function of the setting of the driver-manipulated temperature selector. The first control schedule positions the temperature control actuator to provide a linear relationship between the temperature selector setting and the air discharge temperature with coordinated control of the compressor capacity and the temperature control actuator when air conditioning is enabled, and the second control schedule positions the temperature control actuator to provide a linear relationship between the temperature selector setting and the air discharge temperature when air conditioning is disabled.

6 Claims, 3 Drawing Sheets

ENERGY EFFICIENT CONTROL METHOD FOR A MANUALLY REGULATED VEHICLE HEATING AND AIR CONDITIONING SYSTEM

TECHNICAL FIELD

This invention relates to the control of a manually regulated vehicle heating and air conditioning system, and more particularly to a coordinated and energy efficient control of the air conditioning compressor through a discharge temperature control device.

BACKGROUND OF THE INVENTION

Manually regulated vehicle heating and air conditioning systems include an operator interface for enabling or disabling air conditioning, and for selecting airflow mode (i.e., panel, defrost, etc.), blower speed, and discharge air temperature. When air conditioning is enabled, a refrigerant compressor is activated and its capacity controlled based on a system temperature or pressure to maintain the evaporator temperature a few degrees above the freezing point of water to provide maximum cooling and dehumidification while preventing evaporator icing. The discharge air temperature is selected by positioning a temperature control lever or knob, which in turn, positions a discharge temperature control mechanism (such as an air mixing door) to direct all or a portion of the air exiting the evaporator through a heater core coupled to the engine coolant circulation system. In typical operation in warm ambient conditions, the driver will enable air conditioning, and set the blower speed to high and the temperature to full cold. As the vehicle cabin cools down, the driver usually lowers the blower speed and adjusts the temperature lever until a desired combination of discharge air flow and temperature is achieved. In this scenario, the compressor control remains essentially unchanged, and a portion of the air exiting the evaporator is re-heated by the heater core to achieve the desired air discharge temperature.

It has been recognized that the efficiency of the above-described control can be improved by regulating the capacity of the compressor as the temperature selector is moved away from the full cold setting. In this way, the evaporator temperature is allowed to increase above the full cold setting, and the need for re-heating to achieve the desired air discharge temperature is reduced. For example, the U.S. Pat. No. 4,383,574 discloses a control wherein movement of the temperature lever in the cold-to-medium portion of the temperature control range changes the capacity of the refrigerant compressor while an air mixing device is maintained in the full-cold position, and movement of the temperature lever in the medium-to-hot portion of the temperature control range changes the position of the air mixing device to heat the discharge air. While this system can achieve improved efficiency when air conditioning is enabled by lowering the compressor input power requirement, it also creates an undesired temperature control non-linearity when air conditioning is disabled, since movement of the temperature lever in the cold-to-medium portion of the temperature control range will produce no change in the discharge air temperature. Accordingly, what is needed is a coordinated control of the compressor capacity and the discharge temperature control mechanism that provides improved efficiency when air conditioning is enabled without disturbing the temperature control linearity when air conditioning is disabled.

SUMMARY OF THE INVENTION

The present invention is directed to an improved method of operation for a vehicle heating and air conditioning system having a driver-manipulated temperature selector and a discharge temperature control mechanism, wherein the temperature control mechanism is electrically positioned in accordance with a first temperature control schedule for coordinated control of compressor capacity and heating of the discharge air when air conditioning is enabled, in accordance with a second temperature control schedule when air conditioning is disabled. Both first and second temperature control schedules position the temperature control mechanism as a function of the setting of the driver-manipulated temperature selector. The first control schedule positions the temperature control mechanism to provide a linear relationship between the temperature selector setting and the air discharge temperature during coordinated control of the compressor capacity and the temperature control mechanism when air conditioning is enabled, and the second control schedule positions the temperature control mechanism to provide a linear relationship between the temperature selector setting and the air discharge temperature when air conditioning is disabled. In a preferred embodiment, the temperature control mechanism is positioned in accordance with the second control schedule when air conditioning is initially enabled, and then in accordance with the first control schedule once the system has achieved maximum cooling capability.

DESCRIPTION OF THE PREFERRED EMBODIMENT

Figure 1:
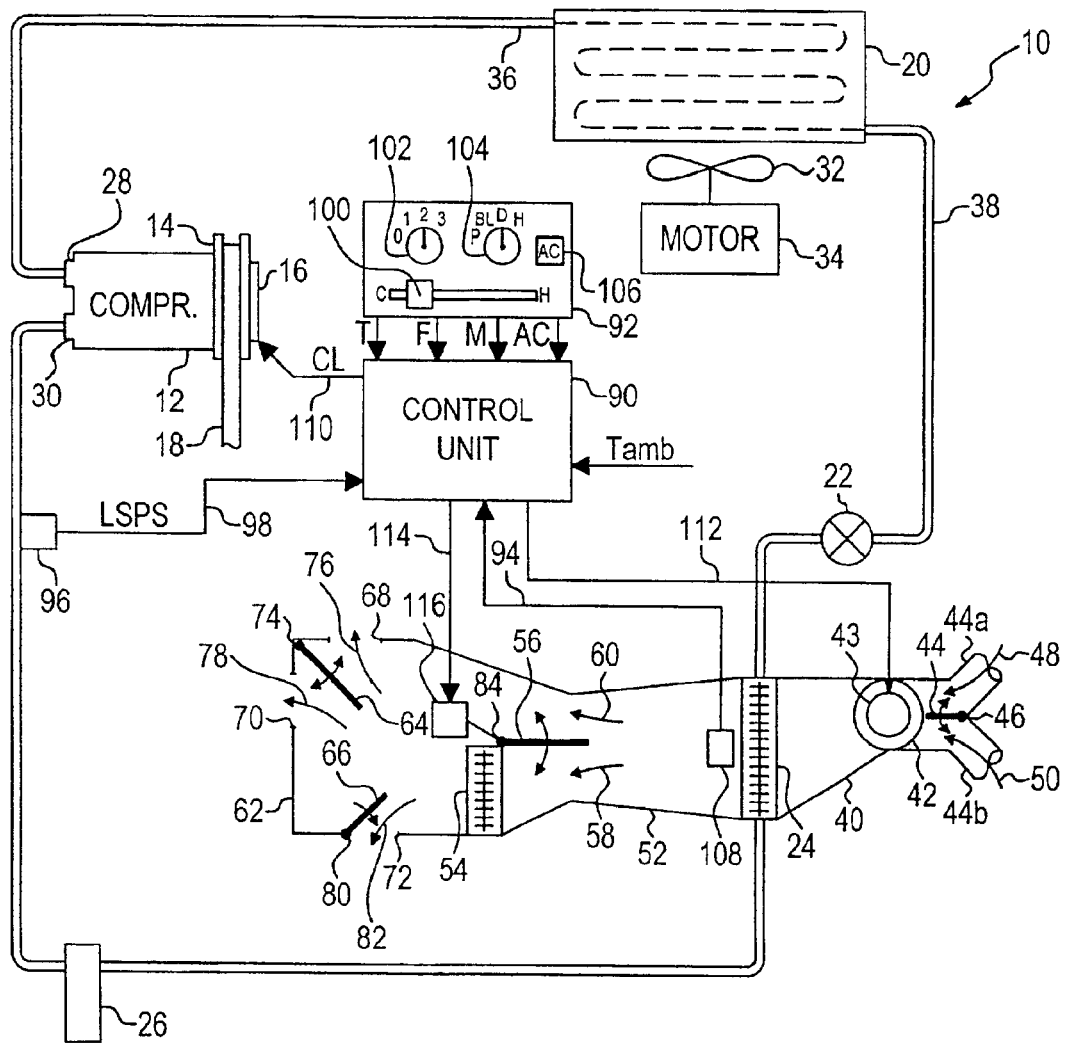
FIG. 1 is a block diagram of a vehicle air conditioning system according to this invention, including a microprocessor-based control unit and a temperature control mechanism.

Referring to FIG. 1, the reference numeral 10 generally designates a vehicle air conditioning system, including a refrigerant compressor 12 coupled to a drive pulley 14 via an electrically activated clutch 16. In the illustrated embodiment, the compressor 12 has a fixed stroke, and is cycled on and off via clutch 16 to control its capacity, but the method of this invention equally applies to systems where the stroke or displacement of the compressor is adjustable to effect capacity control. The pulley 14 is coupled to a rotary shaft of the vehicle engine (not shown) via drive belt 18, and as indicated above, the clutch 16 is selectively engaged or disengaged to turn the compressor 12 on or off, respectively. The system 10 further includes a condenser 20, an orifice tube 22, an evaporator 24, and an accumulator/dehydrator 26 arranged in order between the compressor discharge port 28 and suction port 30. A cooling fan 32, operated by an electric drive motor 34, is controlled to provide supplemental air flow through the condenser 20 for removing heat from condenser 20. The orifice tube 22 allows the cooled high pressure refrigerant in line 38 to expand in an isenthalpic process before passing through the evaporator 24. The accumulator/dehydrator 26 separates low pressure gaseous and liquid refrigerant, directs a gaseous portion to the compressor suction port 30, and acts as a reservoir for the reserve refrigerant charge. In an alternative system configuration, the orifice tube 22 is replaced with a thermostatic expansion valve (TXV); in this case, the accumulator/ dehydrator 26 is omitted, and a receiver/drier (R/D) is inserted in line 38 upstream of the TXV to ensure liquid refrigerant is supplied to the inlet of the TXV.

The evaporator 24 is formed as an array of finned refrigerant conducting tubes, and an air intake duct 40 disposed on one side of evaporator 24 houses an inlet air blower 42 driven by an electric blower motor 43 to force air past the evaporator tubes. The duct 40 is bifurcated upstream of the blower 42, and an inlet air control door 44 pivoted at point 46 is adjustable as shown to control inlet air mixing; depending on the door position, outside air may enter blower 42 through duct leg 44a as indicated by arrow 48, and passenger compartment air may enter blower 42 through duct leg 44b as indicated by arrow 50.

An air outlet duct 52 disposed on the downstream side of blower 42 and evaporator 24 houses a heater core 54 formed as an array of finned tubes that conduct engine coolant. The outlet duct 52 is bifurcated with the heater core 54 disposed in one air stream of duct 52. A temperature control door 56 pivoted at a point 84 near the heater core 54 is adjustable as shown to control what proportion of air exiting evaporator 24 must pass through the heater core 54. Air passing through heater core 54 is indicated by the arrow 58, while air bypassing the heater core 54 is indicated by the arrow 60. The heated and unheated air portions are mixed in a plenum portion 62 of outlet duct 52 downstream of heater core 54 and temperature control door 56, and a pair of mode control doors 64 and 66 direct the mixed air through one or more outlets, including a defrost outlet 68, a panel outlet 70, and a heater outlet 72. The mode control doors 64 and 66, pivoted at points 74 and 80, respectively, are adjustable as shown, to switch the outlet air between various combinations of defrost outlet 68, panel outlets 70, and heater outlet 72, as indicated by arrows 76, 78 and 82, respectively.

The clutch 16, the blower motor 43 and the doors 44, 56, 64, and 66 are controlled by a microprocessor-based control unit 90 in response to driver commands (T, F, M, AC) obtained from a driver interface panel 92, and various system-related signals including the evaporator outlet air temperature signal (EOAT) on line 94, the ambient temperature Tamb, and the output of a low-side pressure switch 96 on line 98. The interface panel 92 may be purely conventional, and includes driver-manipulated inputs such as the temperature lever 100, the blower speed control dial 102, the mode control dial 104, and the air conditioning switch 106. The temperature lever 100 is linearly positioned between cold (C) and hot (H) settings; this produces a temperature command T that is used as described below in a control of the temperature control door 56 and the capacity of compressor 12. The blower speed control dial 102 is rotated to select a desired speed setting for blower 42; this produces a fan command F which dictates the speed of blower motor 43. The mode control dial 104 is rotated to select a desired mode, such as defrost, panel, bi-level, and so on; this produces a mode command M which dictates the position of air control doors 64 and 66. Finally, the air conditioning switch 106 is momentarily depressed to alternately enable and disable operation of the compressor 12; this produces the AC command, which is used in connection with the temperature command T in the below-described control of temperature control door 56 and compressor capacity. Although not indicated in FIG. 1, most automotive air conditioning interface panels also include a switch for selecting the source of inlet air, which dictates the position of inlet air control door 44. The EOAT signal on line 94 may be obtained from a suitable temperature sensor 108 located on the evaporator 24 or in the outlet air stream of evaporator 24. In FIG. 1, the output signal CL for the clutch 16 appears on line 110, and the output signal for controlling blower motor 43 appears on line 112. A temperature control door position command TCDPcmd is developed on line 114, and is applied as an input to an actuator 116 for positioning the temperature control door 56 accordingly. For simplicity, output signals and actuators for the air control doors 44, 64, 66 have been omitted from FIG. 1.

As indicated above, the control of this invention differs from a conventional control in that the position of temperature control door 56 and the capacity of compressor 12 are controlled based on the temperature command T and the air-conditioning enable/disable signal AC. More particularly, the compressor capacity and the re-heating of the evaporator outlet air are coordinated or blended to provide a highly efficient control with a linear relationship between the position of temperature control lever 100 and the discharge air temperature, whether operation of the compressor 12 is enabled or disabled. In other words, the compressor capacity and the re-heating of the evaporator outlet air are blended to maintain a linear relation between temperature command T and the discharge air temperature in a way that significantly reduces re-heating of the evaporator outlet air when air conditioning is enabled. Also, when AC is disabled and the temperature control door 56 is positioned to maintain a linear relation between temperature command T and the discharge air temperature. The control of this invention achieves this desirable outcome by positioning the temperature control door 56 according to a first temperature control schedule for coordinated control of compressor capacity and re-heating when air conditioning is enabled and in accordance with a second temperature control schedule when air conditioning is disabled.

In a preferred embodiment, the temperature control door 56 is positioned in accordance with the second control schedule when air conditioning is initially enabled, and then in accordance with the first control schedule once the low pressure switch 96 (or a similar measuring device) indicates that the system 10 has achieved maximum cooling capability. This effectively establishes an initial "pull down" mode for ensuring that the system 10 has reached its full cooling capacity before transitioning to the energy efficient mode, increasing the likelihood that the system 10 will satisfy the driver's expectations after a period of vehicle inactivity, assuming that ambient conditions have not significantly changed.

Figure 2:
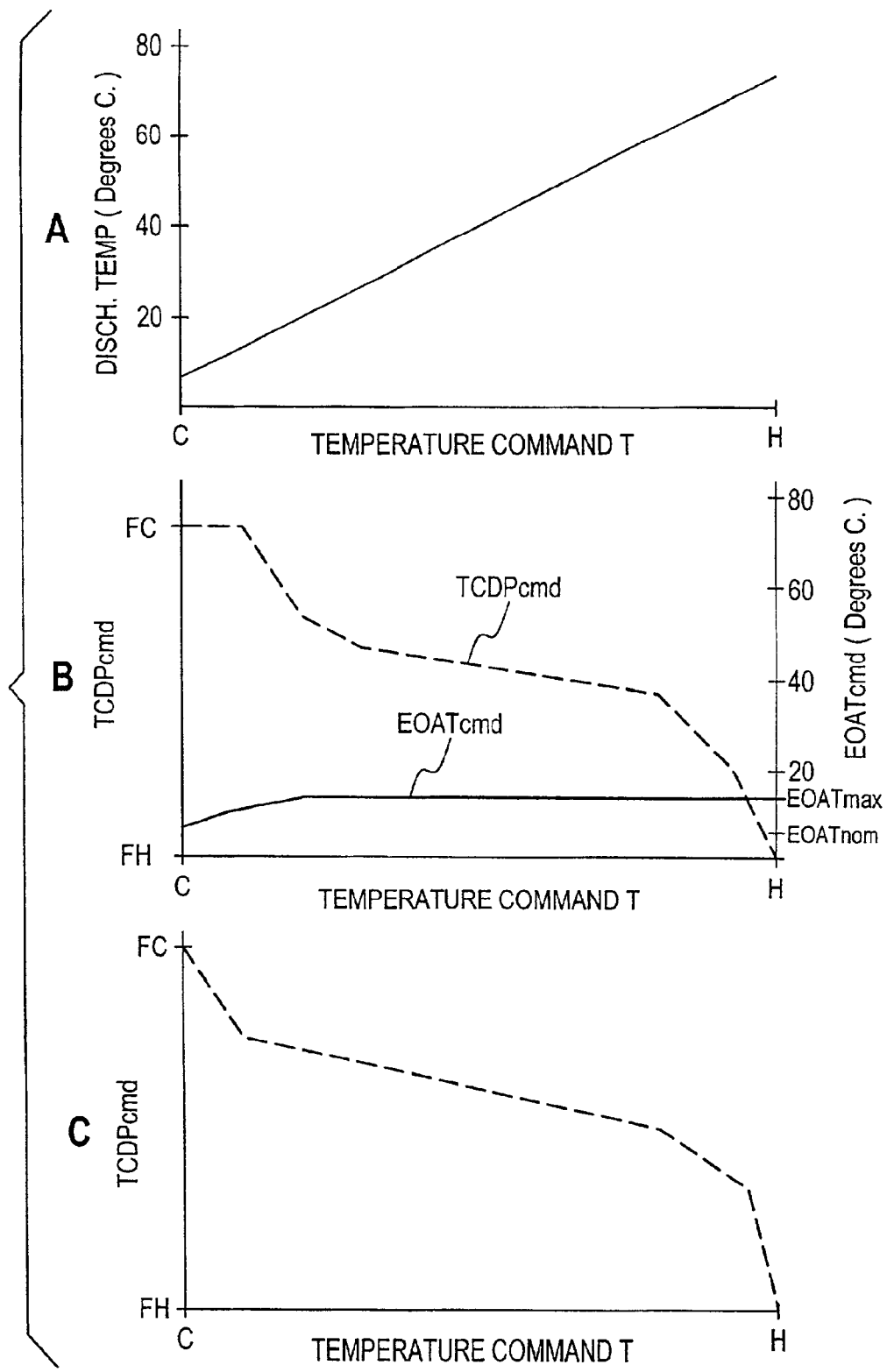
FIG. 2, Graphs A–C, depict control schedules according to this invention.

FIG. 2, Graphs A–C, graphically depict the control of this invention. Graph A depicts the desired air discharge temperature in the Panel or Bi-level modes as a function of the temperature command T, Graph B specifies combinations of evaporator outlet air temperature command (EOATcmd) and temperature control door position command (TCDPcmd) for various values of temperature command T for achieving the corresponding desired discharge air temperature when air conditioning is enabled, and Graph C specifies TCDPcmd for various values of temperature command T when air conditioning is disabled.

Referring to Graph B, it will be seen that at the full cold setting (C) of temperature command T, EOATcmd is set just a few degrees above the freezing point of water to prevent icing on evaporator 24. This is the setting that is maintained so long as air conditioning is enabled in conventional air conditioning systems. For an initial displacement of temperature control lever 100 away from the full cold setting, EOATcmd is increased while TCDPcmd is maintained at a full cold (FC) setting (i.e., no re-heating). As the temperature command T continues to increase, EOATcmd increases to a maximum setting, such as 10 degrees C., and TCDPcmd is adjusted to allow an increasing portion of the evaporator discharge air to flow through heater core 54 so that the discharge air temperature specified in Graph A is achieved, the door 56 being moved to a full heat (FH) setting (i.e., maximum re-heat) when the temperature command T reaches the full hot (H) setting. The non-linear portion of the TCDPcmd schedule linearizes the relationship between discharge air temperature and temperature command T, given the air flow characteristics in duct 52.

Referring to Graph C, it will be seen that when air conditioning is disabled, TCDPcmd is at full cold (FC) when temperature command T is full cold (C), and at full hot (FH) when the temperature command T is full hot (H). As in Graph B, the non-linear adjustment of TCDPcmd with respect to temperature command T between the full-cold and full-hot settings linearizes the relationship between discharge air temperature and temperature command T, given the air flow characteristics of duct 52. While the actual discharge temperature achieved while air conditioning is disabled will vary with the inlet air temperature, the control schedule depicted in Graph C will produce a linear relationship between temperature command T and the amount of discharge air heating.

Figure 3:
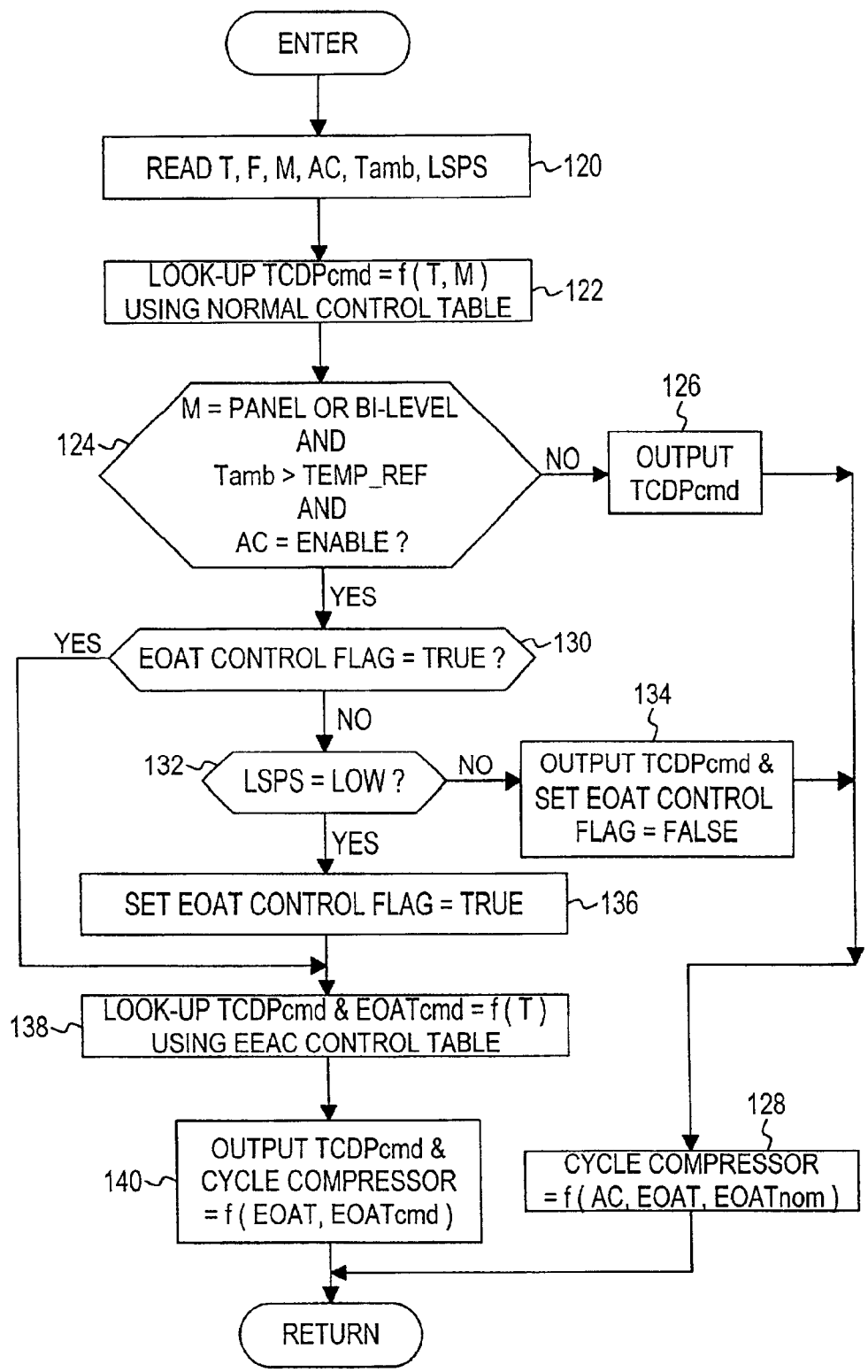
FIG. 3 is a flowchart illustrating a software routine executed by the microprocessor-based control unit of FIG. 1 in carrying out the control of this invention.

FIG. 3 depicts a flow diagram representative of a software routine periodically executed by the control unit 90 for controlling the operation of compressor 12 and temperature control door 56 according to this invention. First, block 120 reads the various inputs from driver interface panel 92, along with the ambient temperature Tamb and the output LSPS of low side pressure switch 96. The block 122 then determines a normal control value of TCDPcmd by table look-up based on temperature command T and mode command M substantially as depicted in Graph C of FIG. 2. The mode dependence is used to produce a somewhat higher discharge air temperature when the Heater or Defrost modes are selected. The block 124 then determines if the mode command M is Panel or Bi-level, and Tamb is greater than a reference temperature TEMP_REF such as 16 degrees C., and the AC command is enabling air conditioning. If one or more of the conditions is not met, the block 126 outputs the TCDPcmd value determined at block 122, and the block 128 controls compressor cycling (if enabled by the AC command) based on a nominal evaporator outlet temperature target (EOATnom) such as 2 degrees C. As is well known in the art, the compressor cycling of block 128 may involve a limit cycle control in which the compressor clutch 16 is engaged when the EOAT exceeds EOATnom, and disengaged when EOAT falls below (EOATnom–Khys), where Khys is a hysteresis constant. If all of the conditions of block 124 are met, the blocks 130–136 are executed to determine if the full cooling capability of system 10 has been achieved, as signified by the status of the EOAT CONTROL FLAG. Initially, the flag will be FALSE, and the block 132 is executed to determine if the low side pressure switch 96 is detecting a refrigerant pressure lower than a calibrated value. If not, the block 134 outputs the TCDPcmd value determined at block 122 and sets the EOAT CONTROL FLAG to FALSE, and the block 128 is executed to control compressor cycling as described above to establish an initial "pull down" mode. When sufficient cooling capability has been achieved, block 132 will be answered in the affirmative, and block 136 will be executed to set EOAT CONTROL FLAG to TRUE, whereafter block 130 will cause blocks 132–136 to be skipped as indicated. If the conditions defined at block 124 are met and the EOAT CONTROL FLAG is set, the blocks 138 and 140 are executed to determine EOATcmd and a new value of TCDPcmd, and to control the compressor capacity and position the temperature control door 56 accordingly. Both EOATcmd and TCDPcmd are determined by table look-up as a function of temperature command T, substantially as depicted in Graph B of FIG. 2. As with block 128, the compressor cycling of block 140 may involve a limit cycle control in which the compressor clutch 16 is engaged when the EOAT exceeds EOATcmd, and disengaged when EOAT falls below (EOATcmd–Khys), where Khys is a hysteresis constant.

In summary, the control of the present invention achieves a coordinated control of the compressor capacity and the temperature control door 56 that improves system efficiency by reducing re-heating when air conditioning is enabled without disturbing the temperature control linearity when air conditioning is disabled. The temperature control door 56 is electrically positioned in accordance with a first temperature control schedule depicted in Graph B of FIG. 2 for coordinated control of compressor capacity and re-heating of the discharge air when air conditioning is enabled, in accordance with a second temperature control schedule depicted in Graph C of FIG. 2 when air conditioning is disabled. While described in reference to the illustrated embodiment, it is expected that various modifications in addition to those mentioned above will occur to those skilled in the art. For example, the coordinated control may be utilized whenever air conditioning is enabled, regardless of the selected mode, if desired. Additionally, the compressor 12 could be cycled on and off based on the refrigerant pressure at the evaporator outlet, and so on. Thus, it will be understood that methods incorporating these and other modifications may fall within the scope of this invention, which is defined by the appended claims.

What is claimed is:

1. A method of operation for a vehicle air conditioning system including a refrigerant compressor, an AC enable/disable device for enabling and disabling air conditioning, an evaporator for cooling inlet air when air conditioning is enabled by said AC enable/disable device, a temperature control mechanism positioned to control re-heating of air exiting the evaporator, and a driver-manipulated temperature selector for setting a desired discharge air temperature, the method comprising the steps of:

enabling and disabling said refrigerant compressor in accordance with said AC enable/disable device, regardless of the setting of said temperature selector;

when air conditioning is enabled by said AC enable/disable device, regulating the capacity of said compressor and the position of said temperature control mechanism as a first function of the temperature selector setting for producing a discharge air temperature corresponding to said desired discharge air temperature; and when air conditioning is disabled by said AC enable/disable device, regulating the position of said temperature control mechanism as a second function of the temperature selector setting for producing discharge air heating in proportion said desired discharge air temperature.

2. The method of operation of claim 1, wherein said first function of temperature selector setting provides a desired temperature of the air exiting said evaporator when air conditioning is enabled by said AC enable/disable device, and, the capacity of said compressor is regulated so that the air exiting said evaporator achieves said desired temperature.

3. The method of operation of claim 1, including the steps of:

defining entry conditions for regulating the compressor capacity and the temperature control mechanism position in accordance with said first function of temperature selector setting; and regulating the temperature control mechanism position in accordance with said second function of temperature selector setting and the compressor capacity in accordance with a nominal control setting when said entry conditions are not met.

4. The method of operation of claim 3, wherein said entry conditions include detecting an ambient temperature in excess of a reference temperature.

5. The method of operation of claim 1, including the steps of:

when air conditioning is initially enabled by said AC enable/disable device, regulating the position of said temperature control mechanism in accordance with said second function of temperature selector setting, and the capacity of said compressor in accordance with a minimum control setting; and when said system has achieved substantially full cooling capacity, regulating the position of said temperature control mechanism and the capacity of said compressor in accordance with said first function of temperature selector setting.

6. The method of operation of claim 5, including the step of:

detecting that said system has achieved substantially full cooling capacity when a low side temperature or pressure of said system has been reduced below a threshold value.

* * * * *